United States Patent [19]

Dieckmann, Jr.

[11] 3,788,455
[45] Jan. 29, 1974

[54] CURVED-PATH SLAT BELT CONVEYOR

[75] Inventor: George W. Dieckmann, Jr., Riverview Gardens, Mo.

[73] Assignee: Food Equipment Corporation, St. Louis, Mo.

[22] Filed: May 10, 1971

[21] Appl. No.: 141,484

[52] U.S. Cl. ............................... 198/182, 198/189
[51] Int. Cl. ............................................. B65g 17/00
[58] Field of Search ............ 198/182, 189, 195, 181

[56] References Cited
UNITED STATES PATENTS

| | | | |
|---|---|---|---|
| 1,149,647 | 8/1915 | Harwood | 198/195 |
| 2,290,981 | 7/1942 | Maguire et al. | 198/189 |
| 3,596,752 | 8/1971 | Garvey | 198/182 |
| 3,627,109 | 12/1971 | Cabak | 198/181 |
| 3,669,247 | 6/1972 | Pulver | 198/189 |
| 3,442,368 | 5/1969 | Heifetz | 198/197 |
| 2,747,725 | 5/1956 | Hatch et al. | 198/195 |
| 3,513,964 | 5/1970 | Imse | 198/189 |
| 2,319,617 | 5/1943 | Manierre | 198/189 |
| 2,844,243 | 7/1958 | Christianson et al. | 198/189 |

FOREIGN PATENTS OR APPLICATIONS

| | | | |
|---|---|---|---|
| 532,254 | 10/1956 | Canada | 198/182 |
| 1,049,302 | 1/1959 | Germany | 198/189 |
| 626,874 | 7/1949 | Great Britain | 198/202 |

*Primary Examiner*—Evon C. Blunk
*Assistant Examiner*—Douglas D. Watts
*Attorney, Agent, or Firm*—Jerome A. Gross

[57] ABSTRACT

A sanitary conveyor of the overlapping slat belt type operates over a curved path of small radius and with minimum wear. Ordinary link chain is used in the conveyor drive. Its alternate links are held vertically by guide blocks beneath each slat, which glide in the central slot of the conveyor bed. The guide blocks and the links they hold vertically serve to present the intermediate links horizontally, for engaging the drive sprockets. Each link so held horizontally is free to pivot angularly relative to the adjacent vertical links, permitting turns of small radius. Provisions are made to minimize friction of the travelling slats and guide blocks.

3 Claims, 6 Drawing Figures

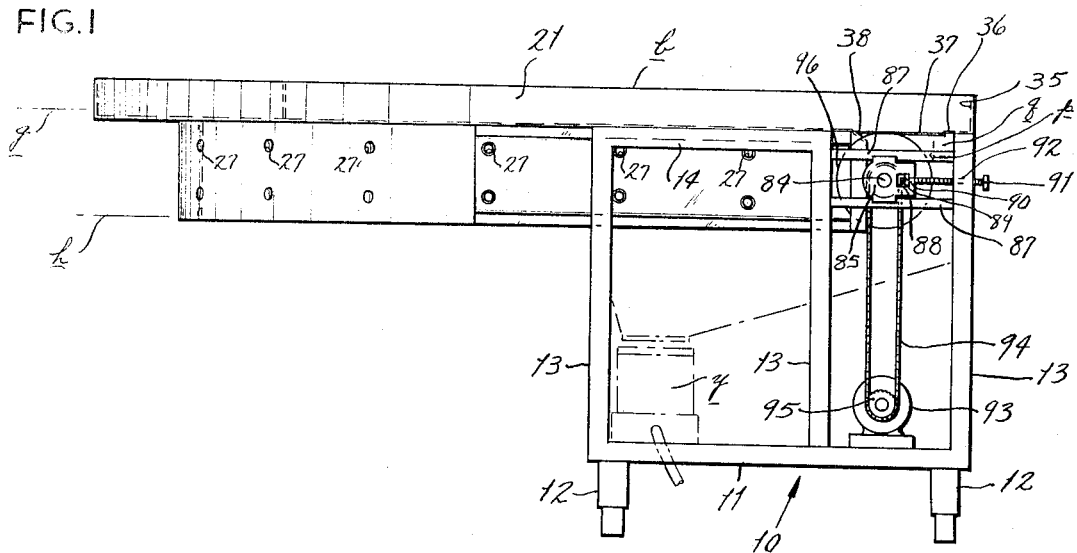
FIG.1
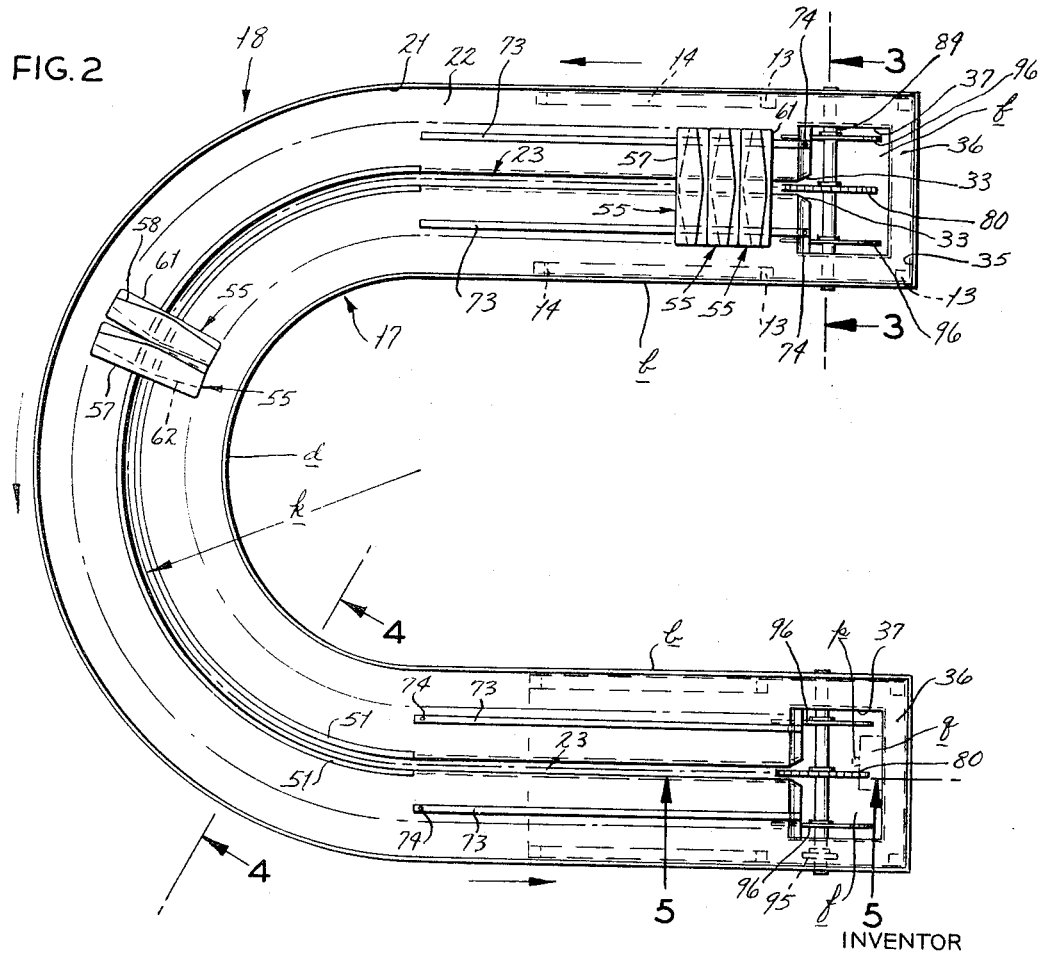
FIG.2
INVENTOR
GEORGE W. DIECKMANN, JR.
BY
ATTORNEY

INVENTOR
GEORGE W. DIECKMANN, JR.
BY
ATTORNEY

INVENTOR
GEORGE W. DIECKMANN, JR.
BY
ATTORNEY

CURVED-PATH SLAT BELT CONVEYOR

BACKGROUND OF THE INVENTION

This invention relates to sanitary conveyors of the type utilizing overlapping slats extending laterally from central guide blocks which are chain-driven in the central slot of a conveyor bed; and particularly to those conveyors whose path is curved, the tension exerted by the drive chain being reacted against the slot wall on the inner side of the curve;

Conveyors of this category have a return path beneath the conveyor path, with sprockets at the path ends to effect the change in level as well as drive the conveyor. Chains which can flex in a vertical plane have been used for this purpose; for example, chain belts similar to bicycle drive chain, whose links are held together by lateral horizontal pins.

Overlapping conveyor slats can round a curved path; this is accommodated by the nesting, on the inner side of the curved path, upper and lower portions of the slats, whose overlapping areas narrow from the center of the slat tips. However, a chain belt, whose links are connected together by horizontal lateral pins, can round such a curve only if special provisions are made, for example by tolerances about the pins. If sufficient tolerance is allowed to permit short-radius curves, wear will be excessive.

Belt chain is not well suited for use in restaurants, or in uses where sanitation is important. Washing sprays, conventionally installed beneath the conveyor path adjacent to a sprocket, cannot be relied on to wash chain belt clean.

As compared with chain made of ordinary stiff loop links, chain belt possesses the advantage that adjacent links will not collapse inwardly if tension is not held uniformly, as may happen when chain is drawn around a curve. To avoid such inward collapse, other forms of chain have been devised, for example U.S. Pat. No. 3,380,571 to Loreck shows alternate links with special lugs which extend inward to abut each other.

In slat-type conveyors whose beds have a central guide slot, it is conventional to use guide means riding in the guide slot. Such guide means may be blocks formed of the same plastic as the conveyor slats and projecting downward from them, to attach to the conveyor chain. This construction is usually attended by substantial friction between the undersurfaces of the slats and the top surface of the conveyor bed; and if the bed slot is curved, friction of the guide blocks against the sides of the slot is greatly increased.

SUMMARY OF THE INVENTION

Summarizing generally and without limiting this disclosure, the present invention provides nobel conveyor features which overcome these deficiencies of prior art conveyors. Instead of chain belt, I use a simple chain whose links are conventional stiff loops having forward and aft curved ends connected by longitudinal portions. Alternate loops are held vertically in slots of guide blocks beneath the successive slats. Links intermediate to those so held are thus presented horizontally to the drive sprockets. Each horizontally presented link may pivot throughout a relatively large angle on the ends of the vertically held adjacent links, without impairing the strength of the chain or its wear characteristics. Thus the chain, though simple and strong, ceases to be a factor which limits the radius of curvature of the conveyor.

In contrast with the special chain shown in U.S. Pat. No. 3,380,517 to Loreck, which prevents inward collapse of links by using special lugs which abut each other, I prevent such inward movement without any extra parts. My slat guide blocks, which embrace the vertical links of the chain, are of such length that their end surfaces abut the horizontal links and prevent their moving inwardly into the vertical links, yet these blocks do not interfere with angular swinging of the horizontal links.

To minimize friction of slat undersurfaces on straight portions of the conveyor bed, flexible friction-minimizing tapes are secured to it. The most effective material for such tapes, presently available unfortunately tends to elongate under the pressure and friction of the load bearing conveyor slats. To overcome this, I secure tapes at the end from which the conveyor slats move, leaving the other end free. The slats have ribs on their undersurfaces, to confine the tapes laterally, and thus hold them in desired lateral position alongside the guide slot. To minimize friction over the curved portion of the conveyor path, slot liner strips of friction-minimizing material project upward sufficiently to support the slats at the same level as that at which the tapes support them over the straight portion of the conveyor path.

BRIEF DESCRIPTION OF THE DRAWINGS

In the accompanying drawings:

FIG. 1 is a view, principally in elevation, of a conveyor embodying the present invention. Alternate provisions for spray washing are shown in phantom lines.

FIG. 2 is a plan view of the conveyor of FIG. 1.

DESCRIPTION OF THE PREFERRED EMBODIMENT

Figure 3:
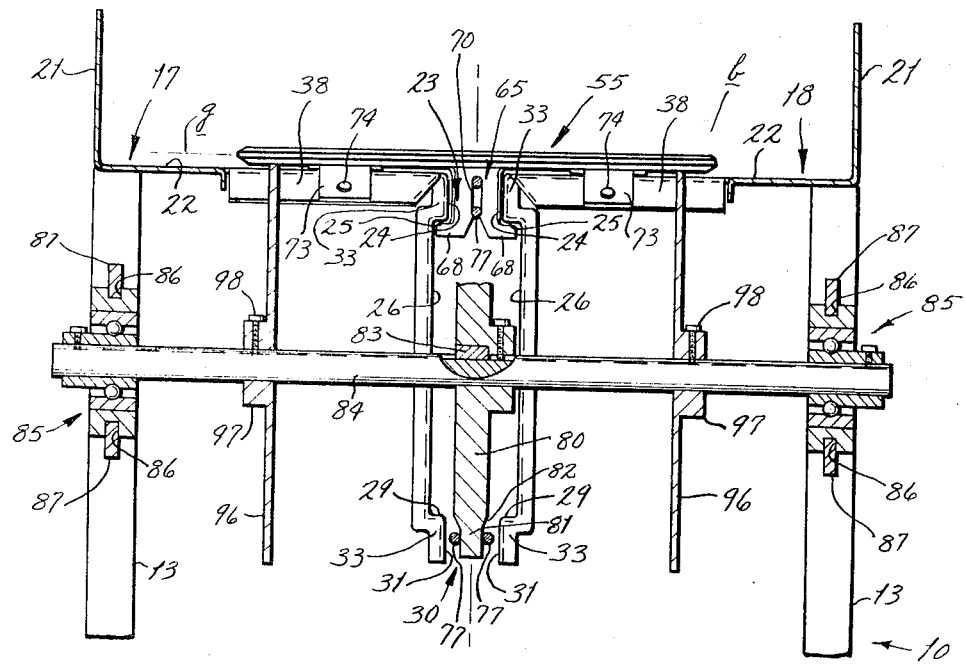
FIG. 3 is an enlarged sectional view taken along line 3—3 of FIG. 2.
Figure 4:
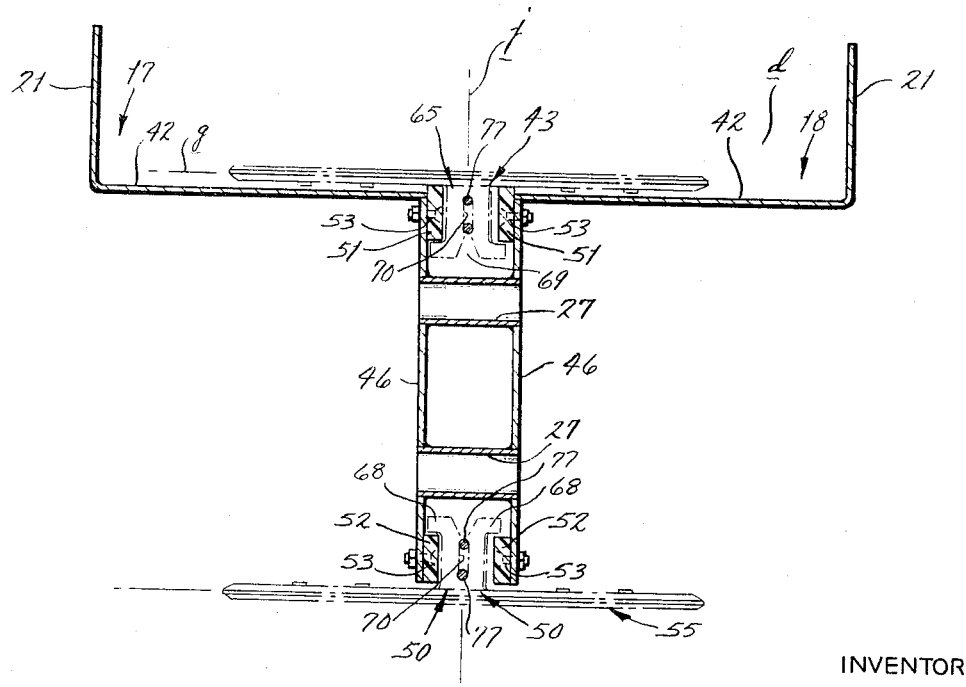
FIG. 4 is a similarly enlarged sectional view taken along line 4—4 of FIG. 2.

A slat type sanitary conveyor, suitable for use in restaurant kitchens, is illustrated in the drawings. It is constructed of stainless steel, joined principally by welding, and includes a rectangular framework generally designated 10 including a base frame 11 supported by legs 12 and a plurality of upright framing members 13. At the top of the framework 10, supported in part by upper horizontal frame members 14, is structure, to be described, which provides a conveyor bed whose U-shaped path has straight end portions generally designated $b$ joined by an intermediate portion n generally designated $d$, curved at a constant radius. A representative cross-section at the straight end portions $b$ is shown in FIG. 3, while that at the curved path portion $d$ is shown in FIG. 4. At the remote ends of each straight portion $d$ are cutout bed portions $f$ which accommodate mechanism, to be described, by which conveyor slats are moved beneath an upper conveyor path at the level $g$ to a slat return path level $h$ aligned beneath it.

Throughout both the straight and curved path portions b, d, the conveyor is bisymmetrical, at every cross-section, about a central vertical axis j. Excluding the framework 10, the structure is principally welded sheet metal. Referring to its U-shaped path, there is an inner bed structure generally designated 17 and an outer bed structure generally designated 18, both supported by the framework 10. Referring to FIG. 3, in the straight path portions b both the inner and outer bed structures 17, 18 commence with outer vertical flanges 21 rising from horizontal surface portions 22 which extend inwardly toward the axis j to an upper central guide slot generally designated 23. The slot 23 is provided, in the straight sections b, by parallel side walls 24 which terminate in downward presented shoulders 25. Below these are parallel structural walls 26, secured to each other by upper and lower spacer tubes 27. The walls 26 lead into upwardly presented shoulders 29 extending inward toward the axis j to a return guide slot generally designated 30, whose parallel side walls 31 are at the same spacing from each other as the side walls 24. The inner and outer bed structures 17, 18 serve in part as sheet metal beams, rigidly defining the straight and curved path conveyor portions b, d.

Within the cutout bed portion f, as seen in the sectional view FIG. 3, the ends of the parallel side walls 24, 26, 31 are flared outwardly to provide lead-in portions 33. For simplicity of illustration, these are shown as being of the same extent at the upper guide slot 23 and the return guide slot 30, at both ends of the conveyor. The requirements for such lead-in portions 33 however differ at the two ends of the conveyor. At one end (shown above in FIG. 2) the lead-in portions 33 must receive guide blocks of slats, hereinafter described, moving to the conveyor path level g; at the other end they must receive the guide blocks moving to the return path level h. Therefore using conventional design practice one would provide large lead-in portions 33 where so required and omit them where not required.

Referring to FIGS. 2 and 3, each cutout bed portion f has an end flange 35, inward of which is an end bed portion 36 bounding a rectangular cut-out 37 slightly wider than the conveyor slats to be described. The horizontal surface portions 22 of the bed structures 17, 18 terminate, within the cut-outs 37, in downward bent bed edges 38, as best shown in FIG. 3.

The curved path portions d are constructed generally similarly to the straight path portions b. As shown in the enlarged cross-section FIG. 4, the outer vertical flanges 21 bound horizontal surface portions 42, which extend inwardly toward the axis j. The horizontal line on which all axes j in the curved portion d fall is defined by a radius k. Along this radius is an upper central guide slot generally designated 43, whose parallel walls 46 are at the same spacing as the parallel structural walls 26 of the straight portion structure b, and are similarly secured to each other by welded spacer tubes 27. The walls 46 lead downward to define a return guide slot generally designated 50, having the same radius of curvature and being in vertical alignment or registration with the upper slot 43.

Alignment of inner sides of the curved upper and lower guide slots 43, 50 with those of the upper and lower guide slots 23, 30 of the straight path portion b, is achieved by lining the upper and lower portions of the side walls 46 with upper and lower friction minimizing wear strips 51, 52. The strips 51, which extend around the entire arcuate length of the upper guide slot 23, are relatively deep, have a rectangular cross-section, and are formed of a slick surfaced plastic which can withstand, without substantial wear, the friction of parts moving thereover. The upper friction minimizing strips 51 extend a short distance above the level of the horizontal surface portion 42, as shown in FIG. 4. To permit replacement, the wear strips 51, 52 are supported in place by countersunk screws 53. The thickness of the strips 51, 62 corresponds to the width of the shoulders 25, 29 in the straight conveyor portions b; they effect correspondence in width between the upper and lower guide slots 43, 50 in the straight portions b and the corresponding upper and lower guide slots 43, 50 in the curved path portion d.

Figure 5:
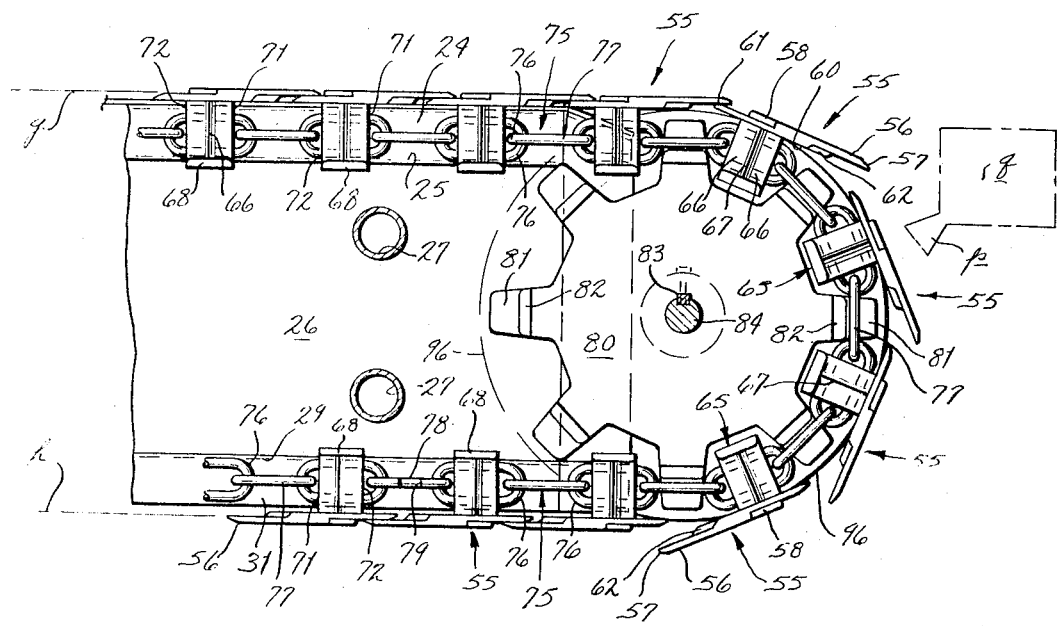
FIG. 5 is an enlarged fragmentary view taken along line 5—5 of FIG. 2.
Figure 6:
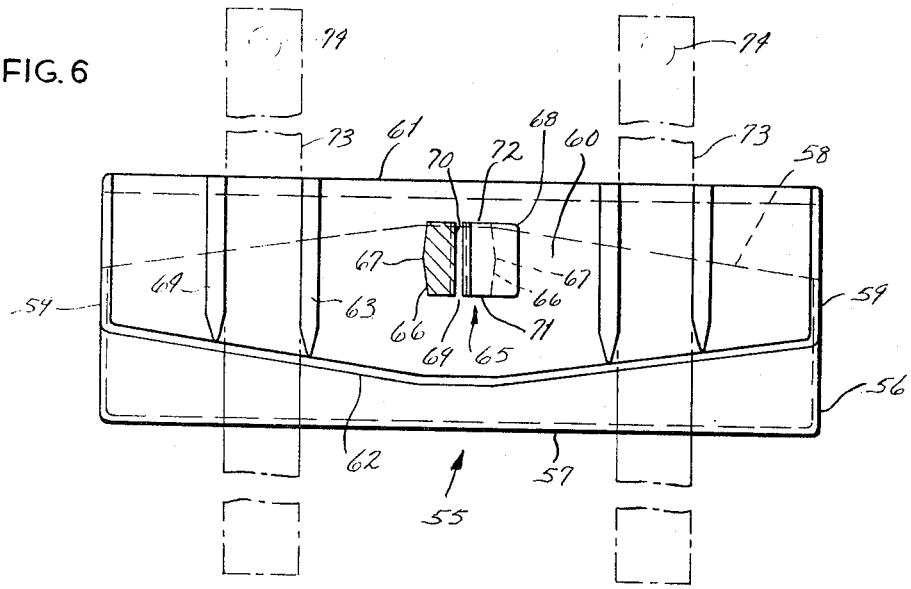
FIG. 6 is an enlarged bottom view of one of the conveyor slats, with its guide block partly broken away. The phantom lines show friction-minimizing tapes which lay on the straight portions of the conveyor.

Covering the conveyor bed surface 15 at the level g and extending continuously about the return path level h, are a continuous belt of conveyor elements, made up of slats generally designated 55, best shown in FIGS. 5 and 6. The slats 55 are of the overlapping lateral slat type. They are formed integrally by molding a heat and wear resistant plastic material such as LEXAN, produced by General Electric Co., has a low coefficient of friction, is readily cleaned, will not support combustion, and possesses some degree of elastic deflectance.

As shown in FIGS. 5 and 6, each of the slats 55 has in effect two overlapped relatively thin planar portions. The upper planar portion 56 extends more forwardly; it has a forward edge 57 perpendicular to its centerline; its aft edge 58 tapers in plan form, to sweep forwardly from center to the lateral tips 59 of the slat 55. The shape of the lower planar portion 60 is the reverse; it has a straight trailing edge 61 and its forward edge 62 tapers sweepingly aft to the slat tips 59. The overlapping areas of the upper and lower planar portions 56, 60 are thus narrowed from the center of the slat tips 59. When the slats are on the straight path portions b, as shown in FIGS. 2 and 5, the forward projecting part of the upper planar surface portion 56 overlaps the aft part of the lower planar surface 60. When they round the curved path portion d, as shown in FIG. 2, their overlapping portions on the inner side of the curve nest together, while those on the outer side of the curve fan out, still overlappng each other. At the ends of the straight path portions b, when the slats 55 move from the level of the conveyor bed g, around end sprockets 75, to be described, to the level of the return path h, they separate and open from each other, as shown in FIG. 5. This permits washing the slats, if desired, by the spray head p of a conventional spray washer q, shown in dashed lines in FIGS. 1 and 5, the water being collected and drained by a conventional sink t and drain strainer y.

On the undersurface of the lower planar portions 60, spaced outwardly from center, are inner nd outer guide ribs 63, 64, whose function will be described subsequently. The depth of the ribs 63, 64 is somewhat less than the thickness of the slats 55.

Projecting downward from each slat 55 midway between its tips 59 is formed a guide block generally designated 65. It is best shown from the side if FIG. 5, from below in FIG. 6, and in end view in FIG. 4. As seen in FIGS. 5 and 6, its fore-and-aft position corresponds generally with the aft edge 58 of the upper planar slat portion 56; it is substantially nearer to the slat trailing edge 61 than to the forward edge 57. With the glide blocks 55 mounted to the chain 75, as hereinafter described and as shown in FIG. 5, when the slats 55 travel around a sprocket 80, as there shown, each forward slat edge 57 will project tangentially outward much farther than the trailing edge 61 of the preceding slat 55, facilitating spray washing as above described.

Each guide block 65 has outer side guide faces 66 which are not parallel but taper or round slightly to the center points 67, whose spacing is the maximum width of the guide block 65. This spacing is nearly equal to the width of the guide slot 23 and return slot 30 in the straight portions b of the conveyor, and of the space between the adjacent surfaces of the friction minimizing wear strips 51, 52 in the curved portion d of the conveyor. The tapered or rounded shape of the faces 66 lessens friction and avoids binding in the curved path portion d. Below the side faces 66, the guide block 65 has laterally outward extending flanges 68. Over the straight portion of the conveyor b, the flanges 68 are so spaced below the lower surface of the slats 55 that the side faces 66 will pass through the guide slot 23 and return slot 30 as to ride against the shoulders 25, 29, and to support the slats 55 on the shoulders 29 when on the return path at the lower level h. Slats 55 in the return curved path portion d of the conveyor are suspended by their flanges 68 resting on the upper edges of the lower friction minimizing wear strips 52.

Midway between the flange portions 68, each guide block 65 has a tapered, somewhat constricted entrance 69 to a central slot 70, as shown in FIGS. 3 and 4. The slot 70 has vertical parallel walls, extending from its forward end surface 71 to its rear surface 72. These receive and grasp a link of a conveyor chain.

When the slats 55 move over the straight path portion b at the level g of the conveyor bed, they are supported on undersurface portions between their inner and outer guide ribs 63, 64 by flexible tapes 73 formed of material which will effectively minimize friction. Of materials presently available, I have chosen tapes made of "Nylatron," which is characterized by an undesirable tendency to elongate with increase in temperature, as may result from friction when the slats 55 are driven rapidly or bear heavy loads. This tendency to elongate creates a problem how to secure a length of such tape 73 to the bed surface 22.

In the present invention, I secure the tapes 73 by countersunk screws 74 at one end only, namely, at the end from which the slats move, the tapes being otherwise free on the surface 22. At the end where the slats rise through the rectangular cutout 37, the screws 74 may best be located in the bent edges 38, as shown in FIG. 2, where the passing slats clear the screw heads. The width of the tapes 73 conforms to the spacing between the inner and outer slat ribs 63, 64, and the thickness of the tapes 73 is somewhat greater than the rib depth. As the slats 55 are driven along the conveyor path, in the direction shown by the arrows in FIG. 2, the ribs 63, 64 confine the tapes 73 laterally on the bed surface 22, to maintain their outward spacing from the guide slots 23. The moving slats 55, thus hold the tapes 73 in parallel alignment, regardless of the extent to which they may elongate.

To support the slats 55 at the same height above the entire path at the conveyor bed level g, the slot-lining friction minimizing wear strips 51 in the curved path portion d are so positioned that their upper edges extend above that surface an extent equal to the thickness of the tapes 73 in the straight path portion b. This is clear from a comparison of FIG. 4 with FIG. 3.

The conveyor chain utilized consists of links generally designated 75 of the stiff loop type, as best seen in FIG. 5. Each link 75 may be formed of heavy, welded stainless steel wire, with forward and aft curved ends 76 connected by a pair of longitudinal portions 77 having a common central plane. The successive links 75 are thus presented in planes at 90percent angles to each other. By the means herein described, every other link 75 is presented horizontally to the drive sprocket, and the links between them will be maintained vertical.

The spacing of the longitudinal side portions 77 of a link 75 is such that they may be press-fitted into the central slot 70 of a guide block 65. The elastic deflectance of the plastic material of the guide block causes the slot 70 to grasp and hold a link 75 securely, yet permits it to be snapped off and replaced.

A slat 55 is mounted, in this way, on every alternate link 75 of the conveyor chain, so as to form a continuous belt. The length of each guide block 69, from its forward surface 71 to its rear surface 72, is about equal to the length of the opening within the loop, measured between its curved ends 76, less twice the thickness of the wire; that is, less the space taken up by the end portions 76 of the adjacent links 75. Thus, as seen in FIG. 5, the guide block ends 71, 72 bear against the end portions 76 of the adjacent horizontal links 75, to hold them spaced apart from each other, so that they cannot move inward and lessen the length of the chain; nevertheless the curved end portions 76 of the adjacent links, connected through each other, may swivel either horizontally or vertically. This permits the belt of slats 55 to be brought from the conveyor path level g to the return path level h over a relatively short radius, and also permits the curved path portion d to have a relatively small radius k, limited not by the chain but only by the plan form taper of the overlapping slat portions 56, 57.

One open link 78 is utilized in the chain. Its longitudinal portion 77 has an opening 79 whose width exceeds that of the wire of which the links 75 are formed; when the tension on the chain is released, the opening 79 permits the belt of slats 55 to be removed for cleaning or replacement.

At each end of the straight conveyor path portion b, the horizontal links 75 of the chain, intermediate between these links on which the slats 55 are mounted, pass over sprockets 80, whose teeth 81 have tapered shoulders 82 on which the links 75 come to rest, to be supported without lateral tilt. The slat guide blocks 65 are accommodated in the spaces between the teeth 81, as shown in FIG. 5.

The sprockets 80 are driven in the manner shown in FIGS. 1, 2, 3 and 5. Each is mounted by a key 83 on a lateral shaft 84 supported in conventional ball bearings mounted in bearing blocks generally designated 85 and having conventional chain tightening provisions. As seen in FIGS. 1 and 3, longitudinal grooves 86 in the upper and lower edges of the bearing blocks 85 mount them adjustably on upper and lower track bars 87, which extend longitudinally between the frame upright members 13. The portion of each bearing block 85 nearest to the end of the conveyor path has a small square window 88 in which a nut 89 is fitted as shown in FIG. 1. From the window 88 a clearance bore 90 leads forwardly and accommodates an adjusting screw 91 which is threaded in a tapped bore 92 in the end frame member 13. By turning its adjusting screw 91 each bearing block 85 is moved toward or away from the end frame member 13, thus tightening or loosening the chain of links 75.

Referring to FIGS. 1, 2 and 3, at the outboard end of the lateral shaft 84 at the driving end of the conveyor, namely the end shown below in FIG. 2, is mounted means to convey power from an electric motor 93. This may be a simple chain belt 94. The shaft of the motor 93 and the lateral conveyor shaft 84 above it are equipped with suitable power drive sprockets 95.

Outboard of the conveyor sprockets 80 on the shafts 84, and spaced from each other less than the lateral extent of the slats, are guide disks 96, whose hubs 97 are mounted to the shaft 84 by set screws 98. As seen in FIGS. 2, 4 and 5, the disks 96 define a semi-circular end path for the undersurfaces of the slats 55, supporting then as they pass, at the rectangular cutouts 37, between the two levels $g$, $h$ at which the slats travel.

The slats 55 are readily mounted on and removed from alternate links 75 of the chain. This may be done with the chain removed from the conveyor; alternately, slats 55 may be mounted or removed when spread apart at the conveyor sprockets 80, as seen in FIG. 5. The slats 55 are automatically positioned centered on the links 75 by the bearing of the forward and rear guide block surfaces 71, 72 against the curved ends 76 of the adjacent links; they thus form in effect a conveyor belt. With a slat so mounted on each alternate link, and with the bearing blocks 85 adjusted inwardly, so the chain will be slack, the belt is positioned so that at one end, the links 75 intermediate those to which the slats 55 are mounted will engage the sprocket teeth 81. The belt of slats 55 is then drawn around the sprockets 80 and the guide blocks 65 are passed through the guide slots 23, 43, 30, 50 at both levels $g$, $h$. The ends of the chain are linked together by the open link 78, after which the bearing blocks 85 are adjusted to tightened position.

In the embodiment illustrated the lateral shaft 84 at the end of the conveyor shown below in FIG. 2 is motor driven; the shaft 84 at the opposite end idles. When the shafts are adjusted to apply tension to the chain of links 75, this tension is resisted by the inner side faces 66 of the guide blocks 65, bearing against the upper and lower friction minimizing wear strips 51, 52 at the inner side of the curved path portion $d$ of the conveyor bed, at both levels $g$, $h$.

Despite the seeming instability of pulling an ordinary endless loop link chain against end sprockets which tension it in the same direction, with the tension resisted about the curve of a conveyor path, the slats 55 (including their guide blocks 65) will maintain the alternate links vertical, so that the intermediate links will at all times be presented horizontally to the drive sprockets 80.

With the present invention, there will be no tendency of the links to bunch inward or collapse together; this is positively prevented by the forward and rear surfaces 71, 72 of the blocks 65 abutting the rounded ends 76 of the intermediate links 75. The friction minimizing provisions, particularly the tapes 73 attached at one end only, have proved effective in overcoming wear in the slats 55 and conveyor bed surface portions 22.

Various modifications will suggest themselves; thus by selecting friction minimizing tapes 73 narrow and flexible enough to fit the curved path portion $d$ of the conveyor, the two tapes 73 attached only at one end, as shown in FIG. 3, might extend continuously around the entire conveyor path at the level $g$, with the guide ribs 63 of the traveling slats 55 maintaining the tapes 73 in alignment regardless of the curvature of the path portion $d$.

I claim:

1. A conveyor of the slat belt type, comprising
   a frame,
   a conveyor bed supported thereby and having central guide slot means defining an upper conveyor path, the frame further having therebeneath slot means to define a lower return path,
   sprocket means mounted on lateral axes at the ends of the path,
   a conveyor drive chain of the type having an even number of equal-sized links each being one stiff wire loop having forward and aft curved ends and longitudinal portions connecting said ends,
   a plurality of conveyor elements of the overlapping slat type, the number thereof being half the number of the links,
   each element having a guide block depending from its lower surface,
   each said block having flexible side walls and a slot extending upwardly therebetween, wherein to receive and grasp alternate links of the chain vertically and hold them immobile within said slots,
   said guide blocks having forward and aft abutment surfaces defining their length as substantially equal to the length of the opening within a chain loop less twice the thickness of the chain end portions,
   whereby the loop ends of the links between said alternate links will abut slidingly against said forward and aft guide block surfaces for angular movement relative thereto, while their abutment thereagainst holds the chain constantly extended and maintains precise spacing of the conveyor slat elements.

2. A conveyor as defined in claim 1,
   the bed including a curved path portion between the path ends,
   the conveyor elements having tapering relief means outwardly of center to permit movement about said curved portion,
   the outer side surface portions of the side walls of said guide blocks tapering in plan form from a minimum spacing, at the forward and aft ends of the guide block means, which spacing is less than the width of the guide slot, to a maximum spacing nearly equal thereto,
   whereby to permit snug fit of the guide block means in and easy movement along the curved portion of the guide slot.

3. A conveyor of the slat belt type, comprising
   a frame,
   a conveyor bed supported thereby and having central guide slot means defining an upper conveyor path, the frame further having therebeneath slot means to define a lower slat return path,
   sprocket means mounted on lateral axes at the ends of the paths,
   a conveyor drive chain, and
   a plurality of conveyor elements of the lateral slat type secured to said chain, each element having pairs of forward-and-aft extending ribs spaced laterally from said guide slot means on both sides thereof, wherein the conveyor bed includes horizontal surface portions on both sides of the central slot means, together with flexible friction minimizing tapes, of a type characterized by likelihood of elongation, and whose width substantially equals the spacings between one of said pairs of ribs, positioned on said surface portions and beneath and supporting the slats of the conveyor at spacings from said slot means, whereby to interfit with the spacings of said ribs, said tapes being secured at their ends from which the conveyor slats move and being otherwise free on said surface.

* * * * *